(12) United States Patent
Takahashi et al.

(10) Patent No.: US 11,787,236 B2
(45) Date of Patent: Oct. 17, 2023

(54) PNEUMATIC TIRE FOR MOTORCYCLE

(71) Applicant: BRIDGESTONE CORPORATION, Tokyo (JP)

(72) Inventors: Junichi Takahashi, Tokyo (JP); Mitsunori Uchida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 170 days.

(21) Appl. No.: 16/740,726

(22) Filed: Jan. 13, 2020

(65) Prior Publication Data

US 2020/0148006 A1     May 14, 2020

Related U.S. Application Data

(63) Continuation of application No. PCT/JP2018/023881, filed on Jun. 22, 2018.

(30) Foreign Application Priority Data

Jul. 14, 2017 (JP) .................................. 2017-138027

(51) Int. Cl.
*B60C 11/00*     (2006.01)

(52) U.S. Cl.
CPC ... *B60C 11/0008* (2013.01); *B60C 2011/0016* (2013.01); *B60C 2200/10* (2013.01)

(58) Field of Classification Search
CPC ............. B60C 11/0008; B60C 11/0041; B60C 11/005; B60C 11/0058; B60C 11/0318;

(Continued)

(56) References Cited

U.S. PATENT DOCUMENTS 6,276,415 B1 * 8/2001 Nakamura ................ B60C 9/22
                                                    152/209.11
6,376,593 B1    4/2002 Sasaka et al.
(Continued)

FOREIGN PATENT DOCUMENTS

CN      102463850 A    5/2012
CN      103826871 A    5/2014
(Continued)

OTHER PUBLICATIONS

Yoshida A, JP-2005271760-A, updated machine translation. (Year: 2005).*

(Continued)

*Primary Examiner* — Galen H Hauth
*Assistant Examiner* — Sedef E Paquette
(74) *Attorney, Agent, or Firm* — Sughrue Mion, PLLC

(57) ABSTRACT

A motorcycle pneumatic tire, in which the tread includes a central rubber and a side rubber, having a lower modulus than the central rubber, that are sequentially laminated in both tire widthwise side portions, the side rubber extending to a tire width-direction inner side further than a point at ¼ of a tread width on a tire width-direction outer side from a tire equator. A tire ground-contact surface has a tread pattern that includes plural inclined grooves and, when the tread width is equally divided in eight, a region constituting a range of ¼ to ⅜ of the tread width on the tire width-direction outer side from the tire equator has the largest number of inclined grooves included per a single pitch of the tread pattern, and the depth of the inclined grooves is greater than the thickness of the side rubber in at least a part of the region.

7 Claims, 2 Drawing Sheets

(58) Field of Classification Search
CPC ....... B60C 2011/016; B60C 2011/0374; B60C 2011/0379; B60C 2200/10; B60C 11/0075; B60C 2011/0025
USPC .................. 152/209.1, 209.2, 209.5, 209.11
See application file for complete search history.

(56) References Cited

U.S. PATENT DOCUMENTS

| | | | |
|---|---|---|---|
| 2010/0101694 A1* | 4/2010 | Ubukata | B60C 11/0058 152/209.5 |
| 2010/0163144 A1 | 7/2010 | Nakagawa | |
| 2010/0193095 A1 | 8/2010 | Nakagawa | |
| 2012/0118462 A1 | 5/2012 | Segawa | |
| 2012/0255660 A1* | 10/2012 | Nakagawa | B60C 11/1323 152/209.11 |
| 2013/0299054 A1 | 11/2013 | Kajimoto | |
| 2014/0158260 A1* | 6/2014 | Kuwahara | B60C 11/0304 152/209.8 |
| 2014/0202605 A1 | 7/2014 | Saiwaki | |
| 2014/0216618 A1 | 8/2014 | Makioka et al. | |
| 2016/0016435 A1 | 1/2016 | Volk et al. | |
| 2016/0339747 A1 | 11/2016 | Takahashi et al. | |
| 2019/0084357 A1* | 3/2019 | Guicherd | B60C 9/22 |

FOREIGN PATENT DOCUMENTS

| | | |
|---|---|---|
| CN | 104890449 A | 9/2015 |
| CN | 105934355 A | 9/2016 |
| DE | 10 2013 103 367 A1 | 10/2014 |
| JP | 11189010 A * | 7/1999 |
| JP | 2005-271760 A | 10/2005 |
| JP | 2007-131228 A | 5/2007 |
| JP | 2008-044449 A | 2/2008 |
| JP | 2012-153318 A | 8/2012 |
| JP | 2012-162160 A | 8/2012 |
| JP | 2013-116709 A | 6/2013 |
| JP | 2014-139031 A | 7/2014 |
| JP | 2014-162367 A | 9/2014 |
| JP | 2014-210470 A | 11/2014 |
| JP | 2016-175597 A | 10/2016 |
| WO | 2009/013961 A1 | 1/2009 |
| WO | 2012/111776 A1 | 8/2012 |

OTHER PUBLICATIONS

Kajimoto K, JP-11189010-A, machine translation. (Year: 1999).*
Hara K, JP-2014210470-A, updated machine translation. (Year: 2014).*
International Search Report for PCT/JP2018/023881 dated Sep. 25, 2018 [PCT/ISA/210].
Extended European Search Report dated Dec. 23, 2020 from the European Patent Office in EP Application No. 18832737.3.
Search Report dated May 8, 2021 in Chinese Application No. 201880046866.2.

* cited by examiner

PNEUMATIC TIRE FOR MOTORCYCLE

This application is a Continuation Application of Patent Cooperation Treaty Application No. PCT/JP2018/023881, filed Jun. 22, 2018, which claims priority from Japan Patent Application No. JP 2017-138027, filed Jul. 14, 2017. The entire contents of these applications are herein incorporated by reference.

TECHNICAL FIELD

The present invention relates to a motorcycle pneumatic tire (hereinafter, also simply referred to as "tire"), more particularly a motorcycle pneumatic tire pertaining to an improvement of a tread portion.

BACKGROUND ART

Two-wheeled vehicles have a characteristic of making turns by tilting the vehicle body, which is different from four-wheeled vehicles such as passenger cars, trucks and buses; therefore, motorcycle pneumatic tires have a shape in which the crown section has a smaller radius of curvature with a rounder cross-section as compared to four-wheeled vehicle tires. In other words, in a motorcycle pneumatic tire, a tread central portion mainly comes in contact with the ground during straight running of the motorcycle, while a tread shoulder portion comes in contact with the ground during turning.

As a prior art relating to a motorcycle pneumatic tire, for example, Patent Document 1 discloses a motorcycle pneumatic radial tire wherein a tread portion is constituted by a central rubber and a side rubber and has a structure in which the central rubber and the side rubber are sequentially laminated in both tire widthwise side portions, and the thickness ratio of the side rubber in the tread portion increases toward the respective widthwise ends of the tire with the side rubber having a lower modulus than the central rubber, whereby the wear life, the grip force and the high-speed durability are all satisfied at higher levels without impairing the linear characteristics in handling.

RELATED ART DOCUMENT

Patent Document

[Patent Document 1] JP2008-44449A (Claims, etc.)

SUMMARY OF THE INVENTION

Problems to be Solved by the Invention

However, in such a constitution of Patent Document 1, when the tread shoulder portions generate heat during turning of the motorcycle, the rigidity is reduced due to conduction of the heat to the high-modulus rubber inside, and this may deteriorate the steering stability during the turning. Further, in motorcycle pneumatic tires, it is also important to ensure the wet grip performance during turning of the motorcycle; however, Patent Document 1 offers no examination in this regard.

In view of the above, an object of the present invention is to provide a motorcycle pneumatic tire in which the wet grip performance during turning is improved while the steering stability during turning is ensured.

Means for Solving the Problems

The present inventors intensively studied to discover that the above-described problems can be solved by defining a low-modulus rubber to be arranged in a prescribed region of a tread portion and grooves provided on the tire ground-contact surface to have prescribed arrangement conditions, thereby completing the present invention.

That is, the present invention is a motorcycle pneumatic tire including: a pair of bead portions; a pair of side wall portions continuously extending on the respective bead portions; a tread portion toroidally extending between the side wall portions; and at least one carcass reinforcing the respective portions between the pair of the bead portions, the motorcycle pneumatic tire being characterized in that the tread portion is composed of a central rubber arranged in a tire width-direction central region sandwiching a tire equator and a side rubber arranged in both tire widthwise end portions having a lower modulus than the central rubber and has a structure in which the central rubber and the side rubber are sequentially laminated in both tire widthwise side portions, with the side rubber extending to a tire width-direction inner side further than a point at ¼ of a tread width TW from the tire equator on a tire width-direction outer side, a tire ground-contact surface has a tread pattern that includes plural inclined grooves, and when the tread width TW is equally divided in eight, among the thus equally-divided eight regions, a region C constituting a range of ¼ to ⅜ of the tread width TW on the tire width-direction outer side from the tire equator has the largest number of inclined grooves included per a single pitch of the tread pattern, and the depth of the inclined grooves is greater than the thickness of the side rubber in at least a part of the region C.

In the tire of the present invention, when the tread width TW is equally divided in eight and, based on the tire equator, a range from the tire equator to a point at ⅛ of the tread width TW on the tire width-direction outer side, a range of ⅛ to ¼ of the tread width TW on the tire width-direction outer side from the tire equator, a range of ¼ to ⅜ of the tread width TW on the tire width-direction outer side from the tire equator, and a range between ⅜ of the tread width TW on the tire width-direction outer side from the tire equator and a tread end are defined as regions A, B, C and D, respectively, it is preferred that the numbers $n_A$, $n_B$ and $n_C$ of the inclined grooves included per a single pitch of the tread pattern in the respective regions A, B and C satisfy a relationship of $n_A \leq n_B < n_C$; and that inclination angles $\theta_A$, $\theta_B$, $\theta_C$ and $\theta_D$ of the inclined grooves included in the respective regions A, B, C and D with respect to a tire circumferential direction satisfy a relationship of $\theta_A < \theta_B < \theta_C < \theta_D$.

Effects of the Invention

According to the present invention, a motorcycle pneumatic tire in which the wet grip performance during turning is improved while the steering stability during turning is ensured can be provided.

MODE FOR CARRYING OUT THE INVENTION

Figure 1:
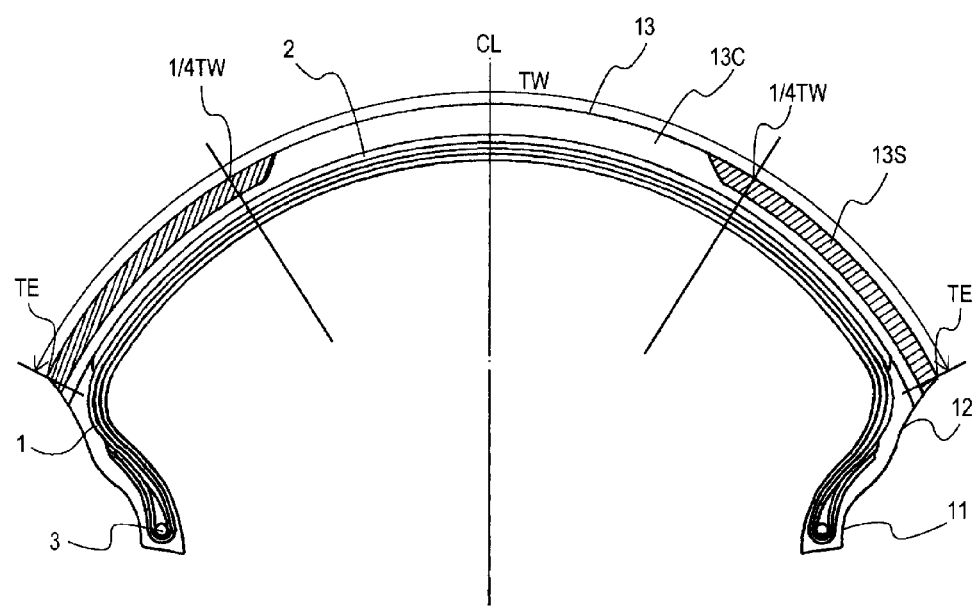
FIG. 1 is a widthwise cross-sectional view illustrating a motorcycle pneumatic tire of the present invention.

Embodiments of the present invention will now be described in detail referring to the drawings.

FIG. 1 is a widthwise cross-sectional view illustrating a motorcycle pneumatic tire of the present invention. The illustrated motorcycle pneumatic tire includes: a pair of bead portions 11; a pair of side wall portions 12 continuously extending on the respective bead portions; and a tread portion 13 toroidally extending between the side wall portions 12. The illustrated motorcycle pneumatic tire also includes: at least one (e.g., 1 or 2) carcass 1 which reinforces the above-described portions between the pair of the bead portions 11; and at least one (e.g., 1 or 2) belt layer 2 which is arranged on a tire radial-direction outer side of the carcass 1 and is formed by spirally winding a reinforcing cord in a circumferential direction.

In the present invention, the tread portion 13 is composed of a central rubber 13C arranged in a tire width-direction central region sandwiching a tire equator CL and a side rubber 13S arranged in both tire widthwise end portions and has a structure in which the central rubber 13C and the side rubber 13S are sequentially laminated in both tire widthwise side portions. Further, the side rubber 13S has a lower modulus than the central rubber 13C. In other words, in both of the tire widthwise side portions of the tread portion 13, the ground-contact surface of the tread is composed of the side rubber 13S having a relatively low modulus, and the inner part of the tread is composed of the central rubber 13C having a relatively high modulus.

As illustrated in FIG. 1, in the present invention, on the tire ground-contact surface, the side rubber 13S having a low modulus extends from each tread end TE to the tire width-direction inner side further than a point at ¼ of a tread width TW from the tire equator CL on the tire width-direction outer side. By adopting this constitution, the side rubber 13S having a low modulus is arranged on the tire ground-contact surface in a range of ¼ to ⅜ of the tread width TW from the tire equator CL on the tire width-direction outer side (the below-described region C), which range is used during turning of the motorcycle; therefore, a good grip force can be ensured during turning of the motorcycle. Meanwhile, with regard to the tire width-direction central region that is used during straight running, a good wear resistance can be ensured because of the presence of the central rubber 13C having a high modulus on the tire ground-contact surface. In the present invention, the term "tread width TW" means a tire width-direction distance between tread ends TE, which is measured along the tread surface in a state where the tire is fitted to an application rim and inflated to a prescribed internal pressure with no load. The term "application rim" used herein refers to a rim defined by an industrial standard that is valid in each region where the tire is manufactured and used, and the term "prescribed internal pressure" refers to an air pressure that corresponds to the maximum load capacity at the application size prescribed in the industrial standard. The "industrial standard" is, for example, JATMA YEAR BOOK of Japan Automobile Tyre Manufacturers Association (JATMA) in Japan, STANDARD MANUAL of The European Tyre and Rim Technical Organisation (ETRTO) in Europe. or YEAR BOOK of The Tire and Rim Association, Inc. (TRA) in the U.S.

Figure 2:
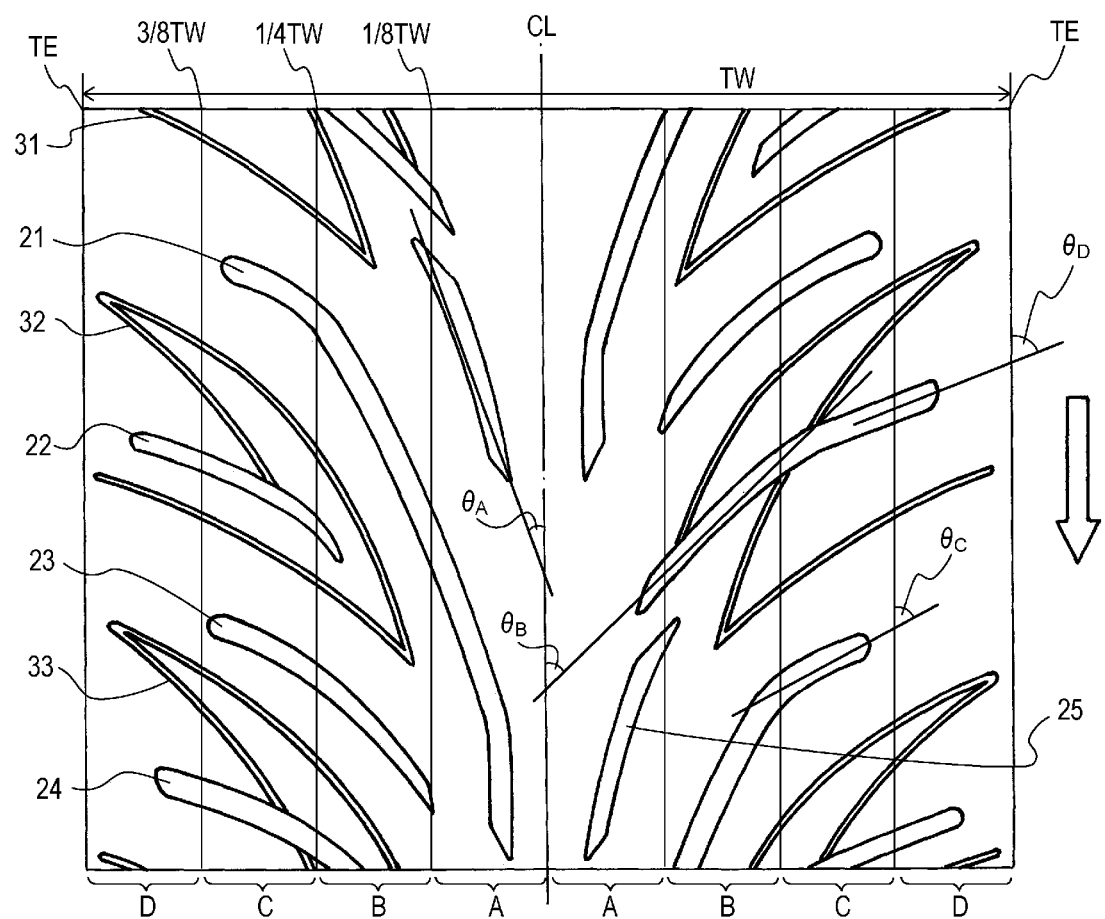
FIG. 2 is a partial development view illustrating one example of a tread pattern of a motorcycle pneumatic tire of the present invention.

FIG. 2 is a partial development view illustrating one example of a tread pattern of a motorcycle pneumatic tire of the present invention. As illustrated, the tire of the present invention has a tread pattern that includes plural inclined grooves 21 to 25 on the tire ground-contact surface. The illustrated tread pattern is a directional pattern that has a designated rotation direction when mounted on a motorcycle. An arrow in FIG. 2 represents the rotation direction of the tire.

As illustrated, in the present invention, the tread width TW is equally divided in eight and, based on the tire equator CL, a range from the tire equator to a point at ⅛ of the tread width TW on the tire width-direction outer side, a range of ⅛ to ¼ of the tread width TW on the tire width-direction outer side from the tire equator, a range of ¼ to ⅜ of the tread width TW on the tire width-direction outer side from the tire equator, and a range between ⅜ of the tread width TW on the tire width-direction outer side from the tire equator and a tread end TE are defined as regions A, B, C and D, respectively. In the present invention, it is important that, among the equally-divided eight regions A to D, the region C has the largest number of inclined grooves included per a single pitch of the tread pattern; and that the depth of the inclined grooves be greater than the thickness of the side rubber 13S in at least a part of the region C.

As described above, in motorcycle tires, since the region C among the regions along the tread width TW constitutes a part that is mainly used during turning of the motorcycle, by configuring the region C to have the largest number of inclined grooves, the drainage performance in the region C can be ensured, whereby the wet grip performance during turning of the motorcycle can be improved. Further, by controlling the depth of the inclined grooves to be greater than the thickness of the side rubber 13S in at least a part of the region C, i.e. by configuring the inclined grooves to penetrate through the side rubber 13S and reach the central rubber 13C in at least a part of the region C, the heat of the central rubber 13C inside can be dissipated through the inclined grooves and the central rubber 13C can thereby be cooled, so that a reduction in the rigidity of the central rubber 13C can be suppressed and deterioration of the steering stability during turning can be inhibited.

Therefore, according to the present invention, by defining the arrangement region of the side rubber having a low modulus and the arrangement conditions of the grooves provided on the tire ground-contact surface as described above, a motorcycle pneumatic tire in which the wet grip performance during turning is improved while the steering stability during turning is ensured can be obtained.

In the present invention, the central rubber 13C and the side rubber 13S are not particularly restricted in terms of their specific moduli as long as the central rubber 13C has a relatively high modulus and the side rubber 13S has a relatively low modulus, and their moduli can be selected as appropriate within a range that is used for a tread rubber of an ordinary tire. For example, with regard to specific moduli of rubber compositions constituting the respective rubbers in terms of 300% modulus at 100° C., the 300% modulus $M_{300}$ (C) of the central rubber 13C may be in a range of 10 to 12 MPa, and the 300% modulus $M_{300}$ (S) of the side rubber 13S may be in a range of 8 to 10 MPa. A good wear resistance can be attained by controlling the 300% modulus of the central rubber 13C to be in the above-described range, while a good grip performance can be attained by controlling the 300% modulus of the side rubber 13S to be in the above-described range.

In the present invention, the side rubber 13S having a low modulus may extend from each tread end TE to the tire width-direction inner side further than a point at ¼ of the tread width TW from the tire equator CL on the tire width-direction outer side, and the side rubber 13S preferably extends to a range of more than 50% to 75% or less of a tire half width TW/2 from each tread end TE.

In the present invention, the thickness of the central rubber 13C and the side rubber 13S is substantially the same across the tire width direction, i.e. the thickness ratio of the side rubber 13S in the tread rubber is substantially constant across the tire width direction. Specifically, for example, the thickness of the central rubber 13C at the tire equator CL, i.e. the thickness of the tread rubber existing on the belt layer 2, can be 6 to 10 mm, and the thickness of the side rubber 13S can be in a range of 50% or more, particularly 50 to 70%, of the thickness of the central rubber 13C.

In the present invention, the number of inclined grooves included in each region is determined by measuring the tire width-direction distance between the tire width-direction ends of each inclined groove in each region and counting the number of inclined grooves that are included across 70% or more of the tire width direction of each region. Further, in the present invention, the term "inclined groove" refers to a groove having a maximum groove width of not less than 2 mm or a maximum groove depth of not less than 2 mm, and the term does not encompass, for example, such a shallow groove whose maximum groove width or maximum groove depth does not satisfy the above-described range. In the present invention, the term "groove width" refers to the width of an opening at a cross-section perpendicular to the extending direction of the groove of interest.

In the present invention, the phrase "the depth of the inclined grooves is greater than the thickness of the side rubber 13S in at least a part of the region C" means that at least some of the inclined grooves included in the region C may each include a part that penetrates through the side rubber 13S and has a depth reaching the central rubber 13C. By this, an effect of inhibiting deterioration of the steering stability during turning can be obtained. Particularly, by allowing all of the inclined grooves included in the region C to have a maximum groove depth greater than the thickness of the side rubber 13S, an effect of cooling the central rubber 13C can be efficiently obtained over the entirety of the tire circumference, which is preferred. It is noted here that, in the present invention, the maximum depth of the inclined grooves included in the region C is preferably in a range of more than 50% to 80% or less of the tread rubber thickness.

In the present invention, it is required that the region C have the largest number of inclined grooves, and it is preferred that the numbers ($n_A$, $n_B$ and $n_C$) of inclined grooves included per a single pitch of the tread pattern in the respective regions A, B and C satisfy a relationship of $n_A \leq n_B < n_C$. By this, the pattern rigidity on the inner side of the ground-contact surface is reduced during turning of the motorcycle as compared to the pattern rigidity on the outer side of the ground-contact surface; therefore, the shearing force in slippery regions is dispersed, whereby an effect of improving the wet grip performance can be obtained. In the region A that is positioned in the vicinity of the tire equator CL, the number of inclined grooves, $n_A$, is preferably small since it is important to ensure the rigidity during straight running. Further, the number of inclined grooves in the region D, $n_D$, is also preferably small from the standpoint of securing the rigidity and thus ensuring the dry grip performance during turning. For example, in the illustrated example, the region A includes the inclined grooves 21 and 25, the region B includes the inclined grooves 21, 23 and 24, the region C includes the inclined grooves 21, 22, 23 and 24, and the region D includes the inclined groove 22; therefore, the $n_A$, $n_B$, $n_C$ and $n_D$ are 2, 3, 4 and 1, respectively. Preferably, the $n_A$ is 1 to 3, the $n_B$ is 2 to 4, the $n_C$ is 3 to 5, and the $n_D$ is 1 to 3.

In the present invention, it is also preferred that inclination angles $\theta_A$, $\theta_B$, $\theta_C$ and $\theta_D$ of the inclined grooves included in the respective regions A, B, C and D with respect to the tire circumferential direction satisfy a relationship of $\theta_A < \theta_B < \theta_C < \theta_D$. By this, the direction of input from the road surface is aligned with the grooves, so that a maximum drainage effect can be obtained. It is noted here that the inclination angles $\theta_A$, $\theta_B$, $\theta_C$ and $\theta_D$ of the inclined grooves each mean, for example, as illustrated in the drawing, an angle on the acute angle side among those angles formed by straight lines, which are drawn by connecting the tire circumferential-direction mid points at the tire width-direction ends of the inclined grooves in each region, with respect to the tire circumferential direction. In the present invention, the phrase "inclination angles $\theta_A$, $\theta_B$, $\theta_C$ and $\theta_D$ of the inclined grooves included in the respective regions A, B. C and D with respect to the tire circumferential direction satisfy a relationship of $\theta_A < \theta_B < \theta_C < \theta_D$" means that the inclination angles of all of the inclined grooves included in the respective regions A, B, C and D are set in such a manner to satisfy the above-described relationship. Accordingly, it is preferred that the inclination angles of the plural inclined grooves included in the respective regions be substantially parallel to each other.

With regard to the inclination angles of the inclined grooves included in the respective regions with respect to the tire circumferential direction, specifically, for example, it is preferred that the inclination angle $\theta_A$ in the region A be in a range of 0° to 20°, the inclination angle $\theta_B$ in the region B be in a range of 20° to 50°, the inclination angle $\theta_C$ in the region C be in a range of 55° to 75°, and the inclination angle $\theta_D$ in the region D be in a range of 60° to 80°.

As illustrated, in the tire of the present invention, decorative grooves 31 to 33 may be arranged on the tire ground-contact surface in addition to the inclined grooves 21 to 25. In the present invention, the term "decorative groove" refers to a groove having a narrow width and a shallow depth, such as a groove that has a maximum groove width of 0.1 mm or larger, preferably 0.5 mm or larger, but less than 2.0 mm, preferably 1.5 mm or less, and a maximum groove depth of 0.1 mm or greater, preferably 0.2 mm or greater, but less than 2.0 mm, preferably 0.5 mm or less. By arranging decorative grooves having a groove width and a groove depth in the above-described respective ranges on the tire ground-contact surface, the drainage performance of the tire in the early stage of use can be improved. Further, in the present invention, it is preferred that, as illustrated, the decorative grooves be also arranged such that the number thereof per a single pitch of the tread pattern is the largest in the region C in the same manner as the inclined grooves. By this, because of the same reason as described above, the wet grip performance of the tire during turning of the motorcycle in the early stage of use can be improved. The number of the decorative grooves can also be determined in the same manner as the inclined grooves.

In the present invention, the arrangement pitch of the inclined grooves and the decorative grooves is not particularly restricted and, for example, the arrangement pitch may be about 1/9 to 1/16 of the whole circumferential length of the tire. Further, in the present invention, with regard to the positions of the inclined grooves and the decorative grooves along the tire circumferential direction, the inclined grooves and the decorative grooves may be arranged alternately between one side and the other side of the ground-contact surface across the tire equatorial plane CL, for example, with the grooves being displaced by ½ to ⅓ of the arrangement pitch.

In the tire of the present invention, it is important that the arrangement conditions of the central rubber and the side rubber that constitute the tread rubber, as well as the arrangement conditions of the grooves provided on the tire ground-contact surface be defined as described above, and this enables to attain the expected effects. The details of other tire structures, materials to be used and the like are not particularly restricted and, for example, the tire of the present invention can be configured as follows.

As the belt layer 2, a spiral belt, which is formed by spirally winding an elongated rubber-coated cord obtained by coating a single reinforcing cord with a rubber or a strip-form ply obtained by coating plural reinforcing cords with a rubber and whose cord direction is substantially the same as the tire circumferential direction, can be used. Alternatively, the belt layer 2 may be composed of two or more inclined belt layers that are arranged such that their cord directions intersect with each other between the layers. The reinforcing cord(s) can be selected as appropriate from steel cords, cords made of organic fibers, such as fibers of aromatic polyamide (aramid, e.g., trade name "KEVLAR (registered trademark)" manufactured by DuPont™), polyethylene naphthalate (PEN), polyethylene terephthalate (PET), rayon, ZYLON (registered trademark) (poly-p-phenylene benzobisoxazole (PBO) fiber) or aliphatic polyamide (nylon), and cords made of glass fibers, carbon fibers or the like. From the standpoint of ensuring the wear life and the high-speed durability at high levels, it is preferred to use a steel cord.

Further, for example, as illustrated, in the tire of the present invention, bead cores 3 are each embedded in the pair of the bead portions 11, and the carcass 1 is folded around the bead cores 3 from the inside to the outside of the tire and thereby anchored. The ends of the carcass 1 may each be sandwiched from both sides and anchored by bead wires, although this is not illustrated in the drawing. Moreover, an inner liner (not illustrated) is formed as an innermost layer of the tire of the present invention.

The tire of the present invention can be applied as both a front tire and a rear tire of a motorcycle, and the tire of the present invention is particularly suitable as a rear tire and may be applied as a tire having either a radial structure or a bias structure.

EXAMPLES

The present invention will now be described in more detail by way of prophetic Examples thereof.

Example 1

In accordance with the conditions shown in the table below, a motorcycle pneumatic radial tire of Example 1 having the cross-sectional structure and the tread pattern as illustrated in FIGS. 1 and 2 is produced at a tire size of MCR180/55ZR17M/C. The carcass 1 is provided in two layers, and nylon is used as a reinforcing cord. Further, as the belt layer 2, a mono-spiral belt obtained by spirally winding a rubber-coated steel cord is used.

The tread portion is constituted by a central rubber (thickness at tire equator CL: 8 mm, 300% modulus $M_{300}$ (C): 11 MPa) arranged in the tire width-direction central region sandwiching the tire equator and a side rubber (thickness: 4 mm, 300% modulus $M_{300}$ (S): 9 MPa) arranged in both tire widthwise end portions, and has a structure in which the central rubber and the side rubber are sequentially laminated in both tire widthwise side portions. Further, on the tire ground-contact surface, the side rubber extends to a position at 70% of the tire half width TW/2 from each tread end TE.

Motorcycle pneumatic radial tires of other prophetic Examples and Comparative Examples are produced by changing the conditions as shown in the table below.

The thus obtained prophetic test tires are designed to be fitted to a rim having a size of MT5.5×17, mounted on a 1,000-cc motorcycle as its rear tire, and then inflated to an internal pressure of 290 kPa. As the front tire, a commercially available tire having a size of MCR120/70ZR17M/C is used.

(Steering Stability During Turning)

For each of the prophetic test tires, the results thereof for a dry surface are indicated as an index, taking the evaluation of Comparative Example 1 as 100. A larger numerical value means a superior and more favorable steering stability.

(Wet Grip Performance During Turning)

For each of the prophetic test tires, the results for a wet surface are indicated as an index, taking the evaluation of Comparative Example 1 as 100. A larger numerical value means a superior and more favorable wet grip performance.

The results of the above-described evaluations are shown together in the table below.

TABLE 1

|  |  | Example 1 | Example 2 | Example 3 | Example 4 | Comparative Example 1 | Example 5 | Comparative Example 2 |
|---|---|---|---|---|---|---|---|---|
| Number of inclined grooves | $n_A$ | 2 | 2 | 1 | 2 | 2 | 2 | 2 |
|  | $n_B$ | 3 | 3 | 4 | 3 | 5 | 3 | 3 |
|  | $n_C$ | 4 | 4 | 5 | 4 | 2 | 4 | 4 |
|  | $n_D$ | 2 | 2 | 1 | 2 | 2 | 2 | 2 |
| Maximum depth of inclined grooves in region C (mm)*1 |  | 5.2 | 5.2 | 5.2 | 5.0 | 5.2 | 5.2 | 3.0 |
| Inclination angle of inclined grooves with respect to tire circumferential direction (°) | $\theta_A$ | 15 | 15 | 15 | 15 | 15 | 15 | 15 |
|  | $\theta_B$ | 30 | 20 | 30 | 30 | 30 | 30 | 30 |
|  | $\theta_C$ | 60 | 40 | 60 | 60 | 60 | 20 | 60 |
|  | $\theta_D$ | 65 | 65 | 65 | 65 | 65 | 65 | 65 |
| Steering stability during turning (index) |  | 110 | 110 | 110 | 108 | 100 | 100 | 98 |
| Wet grip performance during turning (index) |  | 110 | 108 | 108 | 110 | 100 | 102 | 110 |

*1 All of the inclined grooves included in the region C had a portion having a maximum depth in at least a part of the region C.

As shown in the table above, it is confirmed that, in prophetic Examples, the wet grip performance during turning is improved while the steering stability during turning is ensured.

DESCRIPTION OF SYMBOLS

1: carcass
2: belt layer
3: bead core
11: bead portion
12: side wall portion
13: tread portion
13C: central rubber
13S: side rubber
21 to 25: inclined groove
31 to 33: decorative groove
TE: tread end

The invention claimed is:

1. A motorcycle pneumatic tire comprising:
a pair of bead portions;
a pair of side wall portions continuously extending on the respective bead portions;
a tread portion toroidally extending between the side wall portions; and
at least one carcass reinforcing the respective portions between the pair of the bead portions, wherein
the tread portion is composed of a central rubber arranged in a tire width-direction central region sandwiching a tire equator and a side rubber arranged in both tire widthwise end portions having a lower modulus than the central rubber and having a structure in which the central rubber and the side rubber are sequentially laminated in both tire widthwise side portions, with the side rubber extending to a tire width-direction inner side further than a point at ¼ of a tread width (TW) on a tire width-direction outer side from a tire equator,
a tire ground-contact surface has a tread pattern that includes plural inclined grooves, and
when the tread width (TW) is equally divided in eight, among the thus equally-divided eight regions, a region (C) constituting a range of ¼ to ⅜ of the tread width (TW) on the tire width-direction outer side from the tire equator has the largest number of inclined grooves included per a single pitch of the tread pattern, and the depth of the inclined grooves is greater than the thickness of the side rubber in at least a part of the region (C);
the central rubber and the side rubber are sequentially laminated in a tire radius-direction in both tire widthwise side portions;
when the tread width (TW) is equally divided in eight and, based on the tire equator, a range from the tire equator to a point at ⅛ of the tread width (TW) on the tire width-direction outer side, a range of ⅛ to ¼ of the tread width (TW) on the tire width-direction outer side from the tire equator, a range of ¼ to ⅜ of the tread width (TW) on the tire width-direction outer side from the tire equator, and a range between ⅜ of the tread width (TW) on the tire width-direction outer side from the tire equator and a tread end are defined as regions A, B, C and D, respectively,
the numbers nA, nB and nC of the inclined grooves included per the single pitch of the tread pattern in the respective regions A, B and C satisfy a relationship of nA≤nB<nC, in which an upper half part and a lower half part which correspond to parts of a same groove in a repeated groove pattern are counted as only 1 groove in the single pitch, and the number of inclined grooves included in each region is determined by measuring the tire width-direction distance between the tire width-direction ends of each inclined groove in each region and counting the number of inclined grooves that are included across 70% or more of the tire width direction of each region, and
inclination angles θA, θB, θC and θD of the inclined grooves included in the respective regions A, B, C and D with respect to a tire circumferential direction satisfy a relationship of θA<θB<θC<θD;
the number nA is 1 to 3, the number nB is 2 to 4, the number nC is 3 to 5, and the number nD is 1 to 3.

2. The motorcycle pneumatic tire according to claim 1, wherein
a 300% modulus M300 at 100° C. of the central rubber is in a range of 10 to 12 MPa, and the 300% modulus M300 of the side rubber is in a range of 8 to 10 MPa.

3. The motorcycle pneumatic tire according to claim 1, wherein
the side rubber extends to a range of more than 50% to 75% or less of a tire half width (TW/2) from each tread end.

4. The motorcycle pneumatic tire according to claim 1, wherein
a thickness of the side rubber is in a range of 50 to 70% of a thickness of the central rubber.

5. The motorcycle pneumatic tire according to claim 1, wherein
the inclination angle θA in the region A is in a range of 0° to 20°, the inclination angle θB in the region B is in a range of 20° to 50°, the inclination angle θC in the region C is in a range of 55° to 75°, and the inclination angle θD in the region D is in a range of 60° to 80°.

6. The motorcycle pneumatic tire according to claim 1, wherein each of the plural inclined grooves has a maximum groove width of 2 mm or more or a maximum groove depth of 2 mm or more.

7. The motorcycle pneumatic tire according to claim 6, wherein each of the plural inclined grooves has the maximum groove width of 2 mm or more and the maximum groove depth of 2 mm or more.

* * * * *